United States Patent [19]

Reis

[11] 4,189,748

[45] Feb. 19, 1980

[54] VIDEO BANDWIDTH REDUCTION SYSTEM USING A TWO-DIMENSIONAL TRANSFORMATION, AND AN ADAPTIVE FILTER WITH ERROR CORRECTION

[75] Inventor: James J. Reis, Torrance, Calif.

[73] Assignee: Northrop Corporation, Los Angeles, Calif.

[21] Appl. No.: 827,083

[22] Filed: Aug. 23, 1977

[51] Int. Cl.[2] .................. H04N 7/12

[52] U.S. Cl. .................. 358/133; 358/260

[58] Field of Search .................. 364/515, 725; 358/133, 358/135, 136, 138, 260

[56] References Cited

U.S. PATENT DOCUMENTS

| | | | |
|---|---|---|---|
| 3,422,227 | 1/1969 | Brown | 358/135 |
| 3,580,999 | 5/1971 | Mounts | 358/136 |
| 3,585,586 | 6/1971 | Harmon et al. | 358/260 |
| 3,679,821 | 4/1970 | Schroeder | 358/133 |
| 3,984,626 | 10/1976 | Mounts et al. | 358/133 |
| 4,038,539 | 7/1977 | Van Cleave | 364/724 |

OTHER PUBLICATIONS

Picture Bandwidth Compression—Application of Fourier–Hadamard Transformation to Bandwidth Compression—Pratt, Andrews-Gordon & Breach Science Pubs., 1972, pp. 515–554.

Tschen, Motsch—Television Image Coding by Means of Hadamard and Haar Orthogonal Transformations—Acta Electronica 19, 3/1976, pp. 255–270.

*Primary Examiner*—Robert L. Griffin

*Assistant Examiner*—Joseph A. Orsino, Jr.

*Attorney, Agent, or Firm*—Edward A. Sokolski

[57] ABSTRACT

A reduction in bandwidth of two-dimensional video data is obtained by the two-dimensional transformation of the video data by means of one of a class of fast transformations followed by the elimination of certain non-significant transform coefficients prior to the transmission of the transform data. The lower-order transform coefficients or "zonal coefficients" which are usually significant in size, are always transmitted. Prior to transmission, parity bits are added to the zonal coefficients to allow error detection. An adaptive filter eliminates from the higher-order transform coefficients, those non-significant transform coefficients of magnitude less than a threshold level, which level is adjusted in response to the amount of data in the buffer memory awaiting transmission so as to transmit the most significant transform coefficients from a succession of two-dimensional data vectors. At the receiving end of the communication link the array of transform coefficients is reconstituted from the received data. The non-zonal coefficients, eliminated prior to transmission, are replaced by zeros in the reconstituted array. Transmission errors occurring in the zonal coefficients, are detected by parity checks and the erroneous zonal coefficients are replaced by the like transform coefficients from the previously received zonal coefficients corresponding to the prior scan of the same portion of the two-dimensional video data. An approximation to the original video data is obtained by the application of the inverse two-dimensional transformation to the reconstituted array of transform coefficients.

7 Claims, 14 Drawing Figures

VIDEO BANDWIDTH REDUCTION SYSTEM USING A TWO-DIMENSIONAL TRANSFORMATION, AND AN ADAPTIVE FILTER WITH ERROR CORRECTION

BACKGROUND OF THE INVENTION a. Field of the Invention

This invention relates to data compression systems and more particularly to such a system which employs a two-dimensional fast transformation, of a type such as the Haar transformation, to reduce the bandwidth required for the transmission of two-dimensional video data.

b. Description of the Prior Art

U.S. Pat. No. 3,981,443 describes a class of transforms having certain properties which are desirable for the processing of video data in real time. The class of transforms, denoted herein as "fast transforms", has the property that each transform may be expressed as a cascade of elementary transformations in which each elementary transformation is composed of the product of a diagonal weighting matrix and a sparse matrix composed of +1, and −1 and zero elements. By virtue of the decomposition of the transformation into the product of elementary transformations, any member of the class of transforms can be implemented by, at most, 2 $N\log_2 N$ real computations, where N is the dimension of the data vector and is an integral power of 2. U.S. Pat. No. 3,981,443 describes means for mechanizing such fast transforms which require only a relatively small number of adders, subtractors, delayers and multipliers, and which has the ability to achieve high data rates. U.S. patent application Ser. No. 673,799 filed Apr. 5, 1976, and assigned to Northrop Corporation, the assignee of the present application, describes the application of a member of the class of fast transforms, the one-dimensional Haar transformation, to video data for the purpose of bandwidth reduction. In the system of this prior patent application, transform coefficients of a size less than a specified threshold level are eliminated and only the remaining significant coefficients are transmitted, thereby achieving a reduction in bandwidth. In the aforementioned prior application the threshold level in the one-dimensional system is set by the operator so as to transmit all transform coefficients larger than a specified size or to transmit only the "n" largest coefficients. There is no provision for the automatic adjustment of the threshold level to take advantage of variations in the number of significant coefficients which can occur in successive arrays of video data. Also no provision is made in the aforementioned prior application for the detection and correction of errors in the received data.

SUMMARY OF THE PRESENT INVENTION

The system of the present invention takes advantage of the two-dimensional nature of the redundancy in most video data to reduce the signal bandwidth through the application of a two-dimensional fast transformation such as the fast rationalized two-dimensional Haar transformation. A greater reduction in data bandwidth is obtained than would otherwise be obtained from a transformation in a single dimension.

The system of this invention further provides for the automatic and periodic adjustment of the threshold level in the adaptive filter in relation to the amount of data stored in the transmission buffer so as to avoid overflow of the transmission buffer and at the same time to allow selection of the most significant transform coefficients from successive transform data vectors in order to improve the quality of the reconstituted video data while at the same time maintaining a constant transmission bandwidth.

The system of this invention further provides for the detection and correction of most transmission errors which occur in the transmission of certain critical transform coefficients referred to here as zonal coefficients.

In brief, the system of the invention is as follows: Two-dimensional video data is transformed into the transform domain by means of a transformer such as a two-dimensional Haar transformer. A typical two-dimensional video picture is normally subdivided into a number of smaller two-dimensional N×N arrays of picture elements, so that the number of coefficients in the transform will not be unwiedly. For the Haar transformation the lower order coefficients in the transform domain, referred to herein as the zonal coefficients, represent the lower order variations in brightness within each two-dimensional segment of the video data entering the transformer. The output of the transformer is fed to a transform coefficient compressor. Because these zonal coefficients are usually significant in size and are the major factors which determine the brightness level for the particular area of the video picture, the transform coefficient compressor is programmed so as to always transfer a preselected set of these lower order coefficients (the "zonal coefficients") to the modem for transmission. Since the zonal coefficients are always sent (regardless of their amplitude), their proper locations in the reconstructed data are implicitly and unambiguously determined by the a priori knowledge at the receiving modem of the order in which they will appear in the received stream of data. Parity bits are added to each of the zonal coefficients to provide for the detection of transmission errors. Of the remaining transform coefficients, only those of magnitude larger than a threshold are transmitted. Identifying data is attached to each of the latter coefficients so that, following reception, they can be identified and correctly placed in the reconstituted array of transform coefficients. Accordingly, the transmitted data corresponding to the array of transform coefficients consists of a "Start" indicator, followed by the predetermined number of zonal coefficients, followed by the non-zonal coefficients which exceed the threshold, which non-zonal coefficients are each preceded by an identifying address. Coefficients eliminated by the compressor are replaced by zeros in the reconstitution of the array. Errors in the reception of zonal coefficients are detected by means of the parity checks and any erroneous coefficient is replaced by the like zonal coefficient from the data received from the previous scan of the same pictorial area. The reconstituted transform is then passed through a two-dimensional inverse transformer such as the Haar inverse transformer, to obtain an approximation to the original two-dimensional video data.

DESCRIPTION OF THE PREFERRED EMBODIMENT

Figure 1:
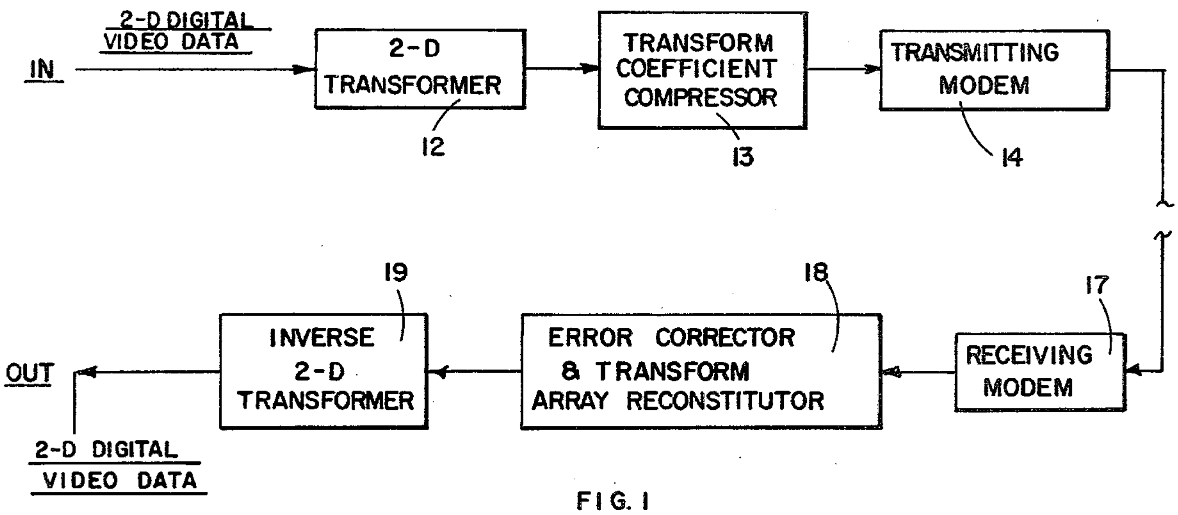
FIG. 1 is a basic block diagram of the system of the invention for the compression, transmission and reconstruction of the two-dimensional video data.

Referring now to FIG. 1, the basic features of the system of the invention are illustrated. Two-dimensional data from some external source is transformed by means of the two-dimensional, fast transformer 12. The transform coefficients generated by the fast transformer 12 are transferred to the transform coefficient compressor 13 wherein a fixed number of the most significant transform coefficients, denoted here as "zonal coefficients", are separated from the remaining coefficients and have parity bits added to allow the detection of transmission errors following detection. The largest of the remaining, non-zonal coefficients are selected by means of an adaptive threshold, coded for identification and together with the zonal coefficients transferred to transmitting modem 14 for transmission. Modem 14 may be any of a number of well known means for transmitting information, such as binary frequency modulation of a radio frequency carrier followed by radiation of the carrier from a suitable antenna. The reduction in bandwidth is obtained by selecting for transmission the zonal coefficients and only those few non-zonal transform coefficients of significant size.

The companion system for reconstructing the two-dimensional video data following reception is also illustrated in FIG. 1. Following reception of the transmitted data, and its demodulation by any of a number of well known methods in receiving modem 17, the transform data are fed to the error corrector and transform array reconstitutor 18 which detects and corrects errors in the zonal coefficients, identifies the non-zonal coefficients selected by the transform coefficient compressor, and reconstitutes the complete array of transform coefficients.

Coefficients eliminated by the transform coefficient processor 13 are replaced by zeroes in the reconstituted array of transform coefficients. The reconstituted array is fed to the inverse two-dimensional transformer 19 wherein an approximation to the original video data is obtained by the inverse, two-dimensional transformation of the reconstituted array of transform coefficients.

Figure 5:
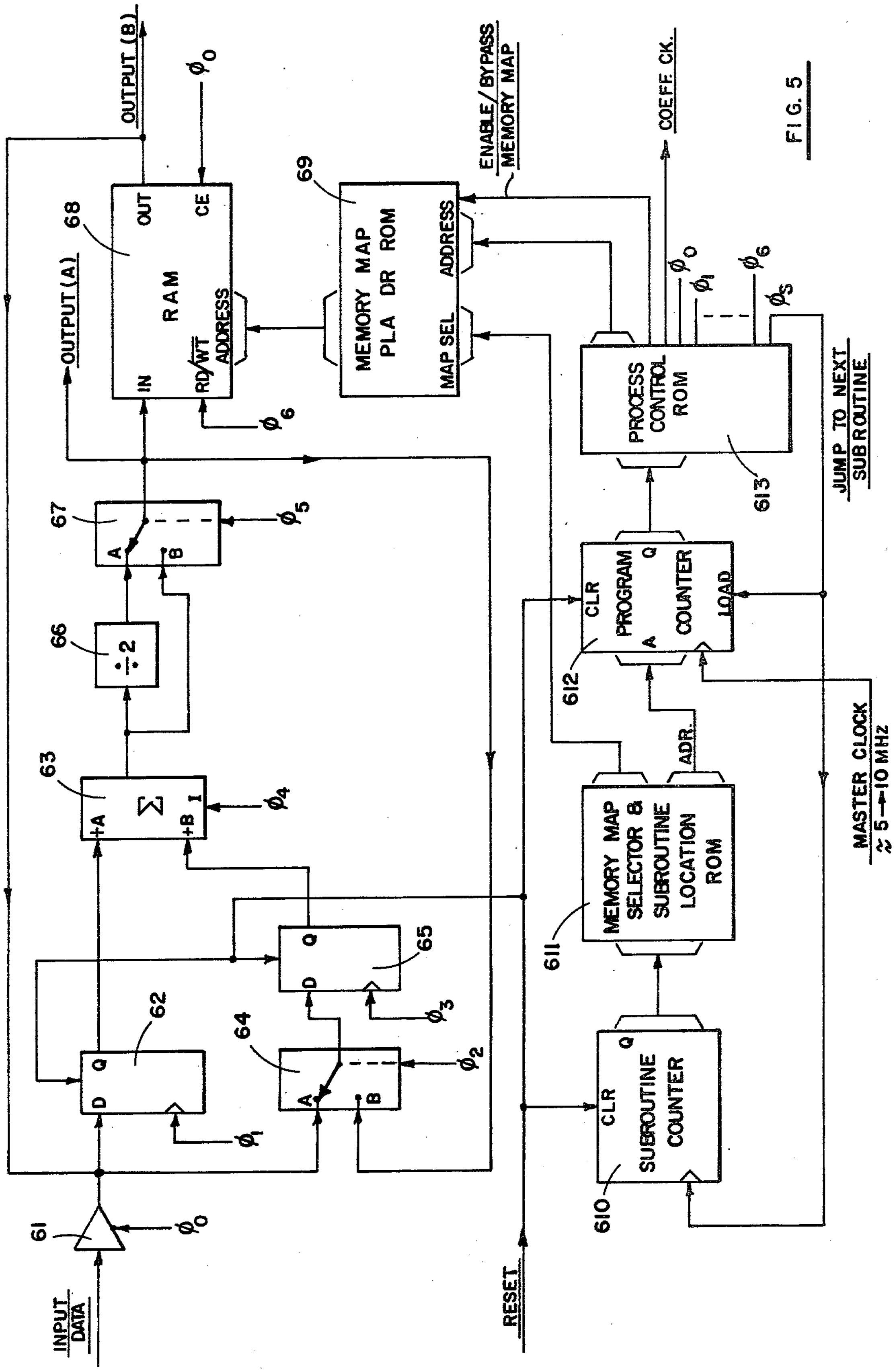
FIG. 5 is the block diagram of a general purpose Haar transformer/inverse transformer which may be used to obtain the one-dimensional or two-dimensional transform or inverse transform.

An example of the logical interconnection of adding and differencing circuits for the mechanization of a one-dimensional fast rationalized Haar transformer is incorporated herein by reference to FIG. 5 of U.S. Pat. No. 3,981,443. The successive sum and difference circuits mechanize, respectively, each of the sparse matrices of the decomposed Haar transform. Further explanation of the mechanization and operation of the one-dimensional Haar transformer is incorporated by reference herein to the aforementioned application Ser. No. 673,799 and U.S. Pat. No. 3,981,443.

Figure 2:
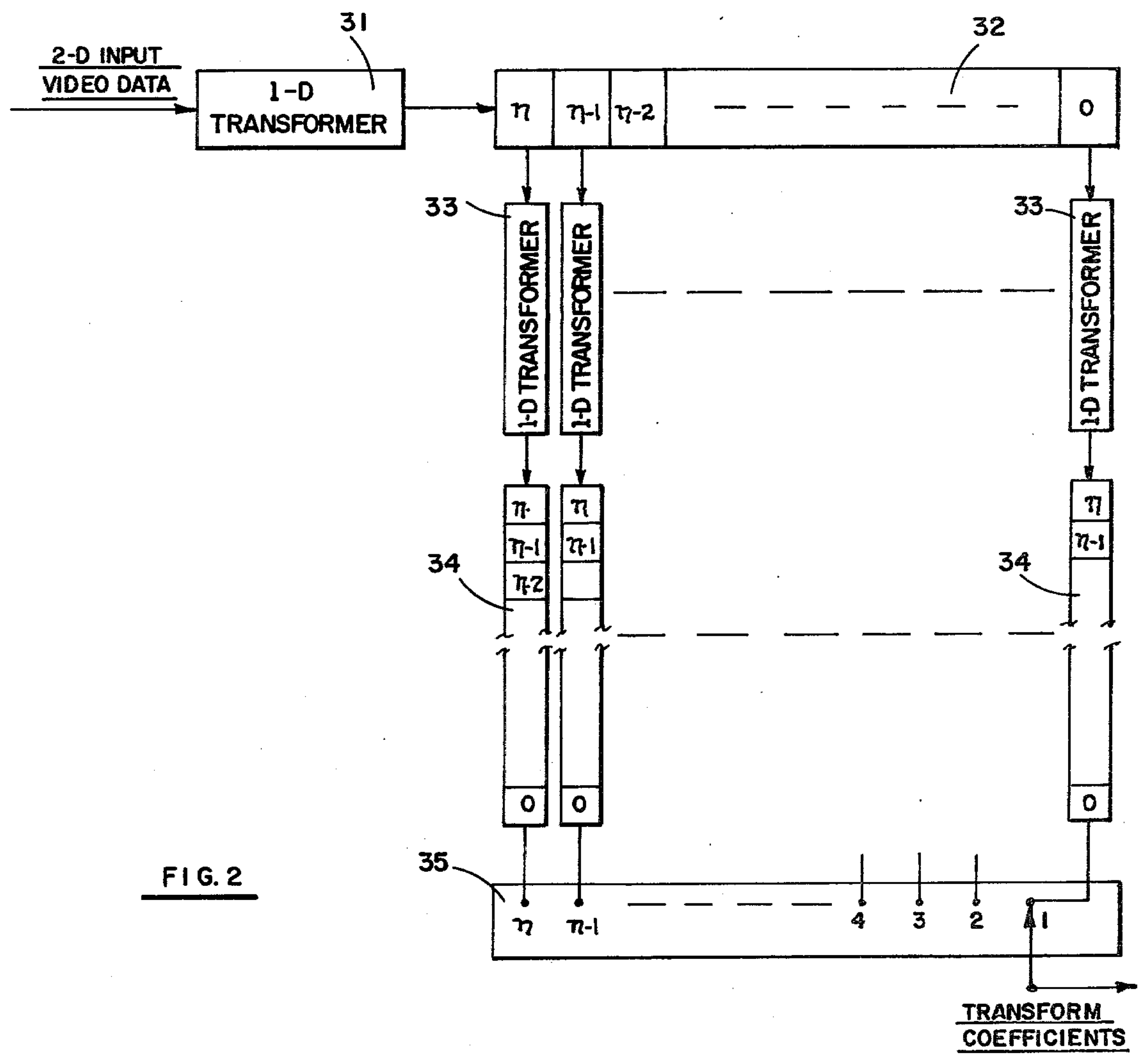
FIG. 2 illustrates a preferred embodiment of the transformer means of the invention denoted configuration "A". A one-dimensional transformer such as the fast rationalized Haar transformer is combined with a plurality of additional one-dimensional transformers to mechanize a two-dimensional transformer.

Referring now to FIG. 2, the logical interconnection of the one-dimensional transformer 31 which performs the transformation of video data in one dimension with a plurality of one-dimensional transformers 33 to perform the transformation in the second dimension is illustrated. The embodiment is denoted transformer configuration "A". Each of the "n" transformers which provide the vertical transformation is only required to operate at a data rate of one nth that of the transformer operating in the horizontal dimension. One-dimensional transform coefficients emerging from 31 are applied to the serial-in/parallel access storage register 32, enabling the plurality of 1-D transformers 33 to each have access to a 1-D transform coefficient within each row of coefficients. With each successive application of a row of input data into 31, another set of transform coefficients are made available to the 1-D transformers 33, and after the input of "N" such rows, the 2-D transform is complete and is then stored in serial-in/serial-out registers 34. A "1 of N" data selector 35 is used to format the coefficients into serial sequency decreasing form by shifting the N coefficients from each of the serial-in/serial-out registers 34, starting with the far right register as shown in FIG. 2.

Those trained in the art will readily recognize that the function of the serial-in/parallel access storage register 32 can be performed by the holding registers shown in FIG. 5 of U.S. Pat. No. 3,981,443 designated R12, R22, R32, R41 and R42 by providing parallel access taps and replacing R12, R22, R32, R42 by parallel-in parallel-out registers. Furthermore, the functions performed by the serial-in/serial-out storage registers 34 have already been incorporated into the 1-D transform embodiment of FIG. 5 of U.S. Pat. No. 3,981,443, therein designated R12, R22, R32, R41, R42.

Figure 3A:
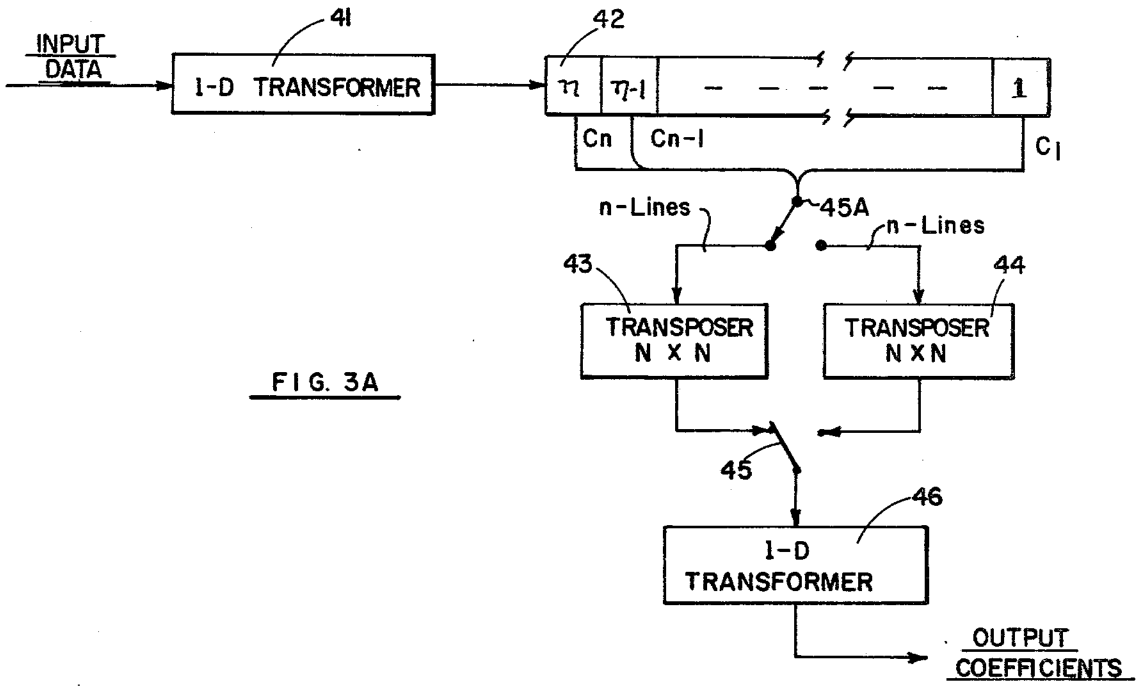
FIGS. 3A–3B are block diagrams showing a second embodiment of the transformer means of the invention denoted configuration "B". The two-dimensional transformer is mechanized using two one-dimensional transformers, one of which performs the transformation in one dimension while the second transformer is, in effect, time shared between columns of data to perform the transformation in the second dimension thus reducing the number of transformers required in exchange for a modest increase in storage and switching requirements.
Figure 3B:
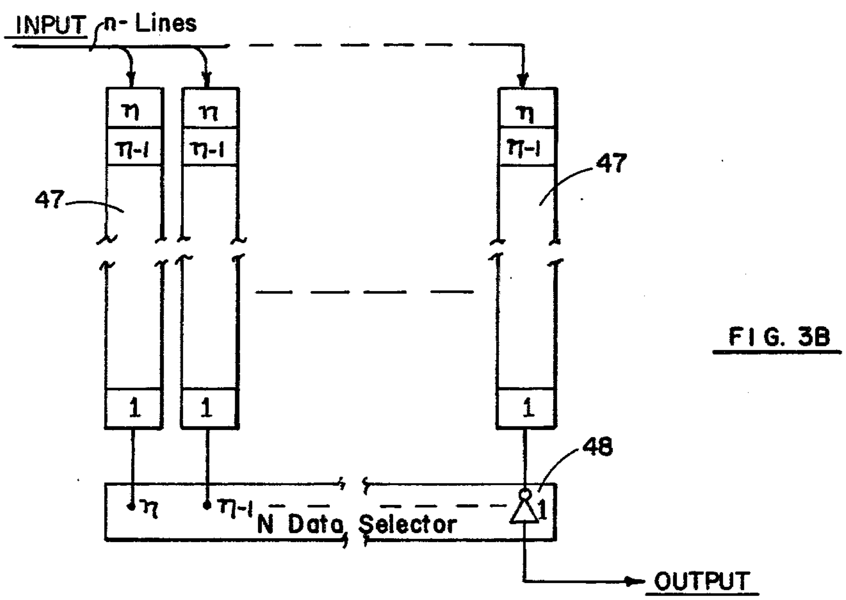

Referring now to FIG. 3A, the mechanization of the two-dimensional transformer using two, one-dimensional transformers is illustrated. The embodiment is denoted transformer configuration "B". Two-dimensional digital video data enters the one-dimensional horizontal transformer 41 and is transformed in the "horizontal" dimension. The output of transformer 41 is shifted into the serial-in/parallel access storage register 42 until the transformation of the data vector is complete. The array of data which has been transformed in one-dimension is then fed from the storage register 42 into one of the two transposers 43 or 44 via switch 45A. Register 42 has an output for each coefficient in one row of the one-dimensional transform. For clarity, these outputs have been labeled (right-to-left) $C_1, C_2 \ldots C_N$, where $C_1$ corresponds to the lowest sequency coefficient of the one-dimensional transform, and $C_N$ corresponds to the highest sequency coefficient. The register 42 outputs have a one-to-one correspondence with the inputs to transposers 43 and 44. The details are shown in FIG. 3B. The transposers are interchanged after each complete 2-D transform. This interchange is required to insure continuous data processing. While one transposer is filling, the other transposer is emptying through data selector 45 into the second 1-D transformer 46.

Transposer details are shown in FIG. 3B. Data from register 42 are fed into serial-in/serial-out registers 47. Each of the inputs to the n registers 47 is uniquely connected to one of the N outputs provided by register 42 as indicated by the labels $C_1, C_2 \ldots C_N$. Registers 47 are clocked one time for each completed 1-D transform. After n 1-D transforms, the transposer 43 or 44 is filled and ready to provide input data into 1-D transformer 46 through switch 45 and through the 1 of n data selector 48, which transfers all of column 0 before selecting column 1, and so on until after $n^2$ clock pulses, the nth coefficient of column n is shifted into 1-D transformer 46. Advantage is taken of the lower data rate required for the transformation of each column of coefficients so that a single one-dimensional transformer may be time-shared or time multiplexed to perform the operations required of the n-transformers depicted in FIG. 3 which perform the 1-D transformation in the second or vertical dimension.

Figure 4:
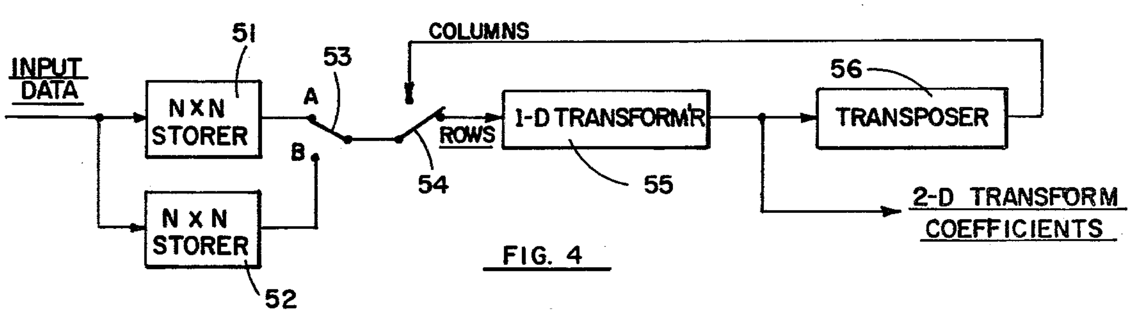
FIG. 4 is a block diagram illustrating a third embodiment of the transformer means of the invention denoted configuration "C". A single one-dimensional transformer is time shared to perform the transformations in both horizontal and vertical dimensions thus eliminating the need for a second transformer in exchange for a reduction by approximately one-half in the throughput data rate.

Referring now to FIG. 4, a means for mechanizing a two-dimensional transformer by use of a single one-dimensional transformer is illustrated. The embodiment is denoted transformer configuration "C". In circumstances where the data handling capacity of the one-dimensional transformer is at least twice the video data rate, the one-dimensional transformer 55 can be time shared to effect the transformation of the video data in both dimensions. Two-dimensional video data enters temporary storage unit 51 where it is stored until the processing in the second dimension of the previous set of data is complete. The video data from temporary storer 51 then passes through data selector switch 53 and row/column selector switch 54 to the one-dimensional transformer 55. 1-D transformed row data is stored in transposer 56 in the manner analogous to that described in connection with FIG. 3B. Row/column selector switch 54 is then set to the column position after the last row from 51 or 52 has been 1-D transformed and the transformation in the second dimension is calculated. The output of the transformer 55 is then available. While data from storage unit 51 is being transformed by unit 55, new input data is being accumulated by storage unit 52. Upon completion of the 2-D transformation of data from storer 51, data from storage unit 52 is passed through data selector 53 and row/column selector 54 for transformation in a similar manner.

Referring to FIG. 5, a means is shown for mechanizing a general purpose 1-D/2-D transformer/inverse transformer by use of a single arithmetic element 63, which is time shared to allow iterative processing of the input data. The process control read only memory 613 (ROM) contains a table of interconnect and clocking signals which uniquely controls the state of the data processing elements 61 through 67. Program counter 612 sequences the process control ROM by one step for each application of the master clock, which typically is between 5 and 10 MHz. Provisions have been included to force the program counter 612 to repeat or to skip a series of program steps by application of pulse $\phi_s$ from process control ROM 613. $\phi_s$ causes subroutine counter 610 to increment, which in turn selects a new starting point for program counter 612 from numbers previously stored in ROM 611. ROM 611 not only provides program counter initialization parameters, but also provides for selection of the appropriate memory map contained in ROM 69. The selection of an appropriate memory map allows addresses generated by the process control ROM 613 to be altered in a deterministic manner that is beneficial to efficient hardware utilization.

By way of example only, and not by limitation, the sequences of ROM states will be detailed for implementing a 4×4 2-D Haar transform. Those skilled in the art can readily construct similar sequences for realizing both forward and inverse one- and two-dimensional Walsh/Hadamard, Haar, and similar transforms of arbitrary dimensions.

For purposes of this discussion let the following terms apply:

| | |
|---|---|
| $\phi_o = 1$ | Enable Random Access Memory, RAM 68 And disable Tri-state gate, 61. |
| $\phi_o = 0$ | Disable RAM 68, Enable 61. |
| $\phi_1 = 1$ | Store into Register 62 |
| $\phi_1 = 0$ | Get ready to store into 62 |
| $\phi_2 = 1$ | Select A input of Data Selector 64 |
| $\phi_2 =$ | Select B input of Data Selector 64 |
| $\phi_3 + 1$ | Store into Register 65 |
| $\phi_3 = 0$ | Get ready to store into 65 |
| $\phi_4 = 1$ | Compute $\Sigma = B - A$ |
| $\phi_4 = 0$ | Compute $\Sigma = B + A$ |
| $\phi_5 = 1$ | Select A input of Data Selector 67 |
| $\phi_5 = 0$ | Select B input of Data Selector 67 |
| $\phi_6 = 1$ | Read from RAM 68 at address specified |
| $\phi_6 = 0$ | Write into RAM 68 at address specified |
| $\phi_s = 1$ | Increment Subroutine counter 610 and load program counter 612 |
| $\phi_s = 0$ | Get ready to increment 610 and load 612 |

Let the input data be arranged in standard raster scan format and designated as:

| | | | |
|---|---|---|---|
| A | B | C | D |
| E | F | G | H |
| I | J | K | L |
| M | N | O | P |

where A is the first sample, and P is the last.

The 2-D fast rationalized Haar transform sequence is given in the Algorithm following the description.

Figure 6:
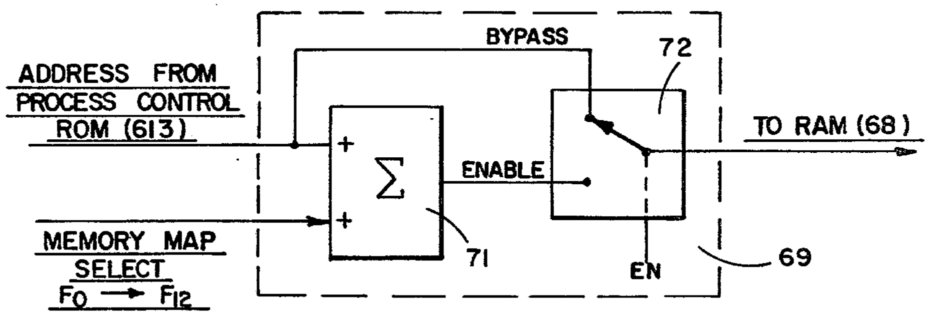
FIG. 6 is the block diagram of the specific memory mapping circuitry used to implement the two-dimensional Haar transform.

Referring now to FIG. 6, the specific memory mapping circuitry is illustrated that can be used in conjunction with the algorithm appearing at the end of the specification, to mechanize the 2-D Haar transform. Adder 71 provides an offset in memory address by the amount F(i), where F(i) corresponds to a memory offset of +i units. Data selector 72 provides means for enabling or disabling the memory mapping function.

Figure 7A:
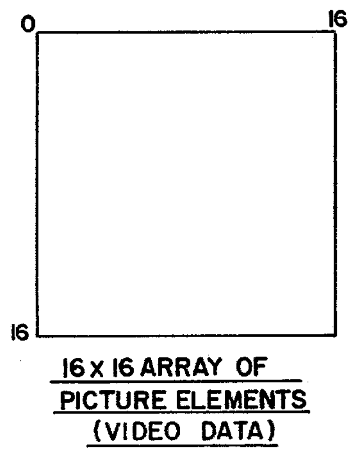
FIGS. 7A and 7B are illustrations showing the relationship between the two-dimensional video data and the transform coefficients for the case of a fast, rationalized Haar transformation.
Figure 7B:
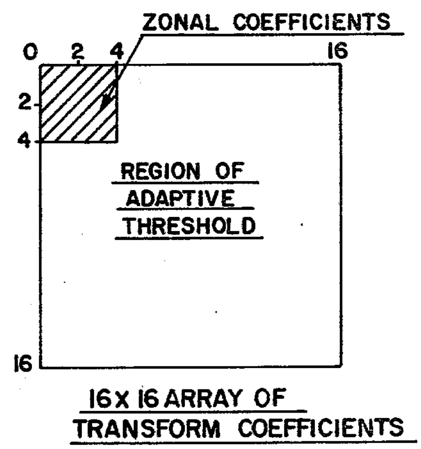

Referring now to FIGS. 7A and 7B, a 16×16 array of picture elements is illustrated together with the 16×16 array of transform coefficients. For purposes of illustration, the lowest order transform coefficients, illustrated in FIG. 7B by the 4×4 submatrix, are denoted the zonal coefficients, although a different number in some instances may be preferred. Reference to the Haar transform shows that lowest order coefficient represents the average brightness of the video data over the video array and the next higher order coefficients represent the differences in the average values of various half and quarter sections of the video array. These lower order coefficients which represent the brightness and its grosser variations are always selected for transmission. The higher order transform coefficients, which sample only small portions of the video array, have significant values only if a rapid change in brightness (a pictorial "edge") occurs in the particular small portion of the video data from which the transform coefficient is determined. The higher order coefficients of significant size are selected by the adaptive filter, identified by the addition of an address and then forwarded to the transmission buffer for transmission to the receiver. The transmission of the zonal coefficients and only those transform coefficients representing pictorial "edges" removes or at least significantly reduces the redundancy present in video pictures containing many areas of nearly uniform brightness.

Figure 8:
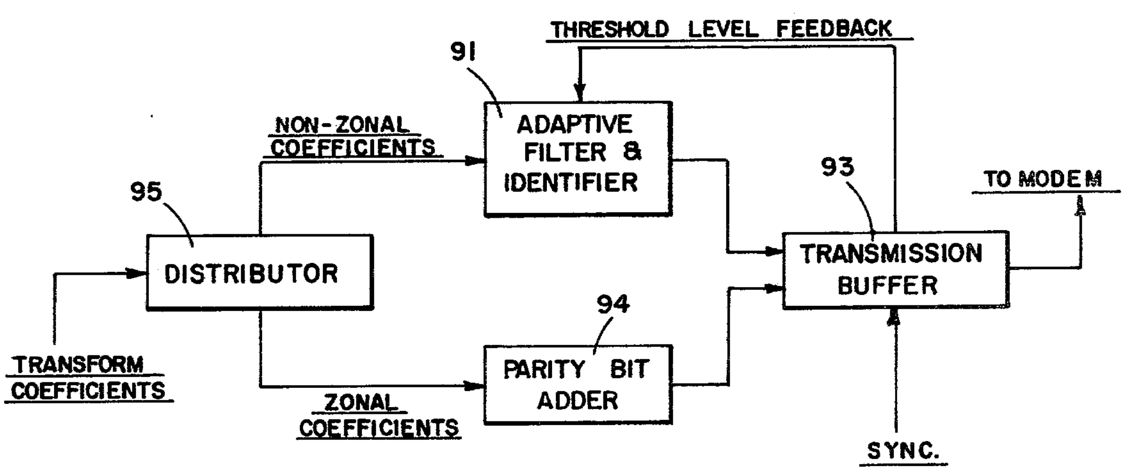
FIG. 8 is a block diagram illustrating a preferred embodiment of the transform coefficient compressor of the invention.

Referring now to FIG. 8, a preferred embodiment of the transform coefficient compressor is illustrated. The transform coefficients which enter the distributor 95 are separated into two groups with the zonal coefficients being directed to the parity bit adder 94 and the non-zonal coefficients being directed to the adaptive filter and identifier 91. Parity bits are added to the zonal coefficients by the parity bit adder and the zonal coefficients are then transferred to the transmission buffer 93 to await transfer to the modem.

Non-zonal coefficients which are smaller in absolute magnitude than a certain threshold level are eliminated by the adaptive filter and identifier 91, and identifying addresses are added to the remaining non-zonal coefficients. The zonal coefficients and selected non-zonal coefficients from the adaptive filter and identifier and from the parity bit adder are collected in the transmission buffer 93. Zonal coefficients from a plurality of successive arrays of transform coefficients are collected and transferred to the modem for transmission in a single block to reduce the amount of transmitted data which must be allocated to synchronizing pulses. After processing a sequence of coefficient matrices, the threshold level of the adaptive filter is automatically adjusted so as to avoid overflow of the transmission buffer while processing the next sequence, while at the same time allowing the transmission of a greater or lesser number of non-zonal coefficients from individual arrays of transform coefficients within the sequence. In this way, greater amounts of data are transmitted in connection with transform arrays which represent more "interesting" video data.

Figure 9:
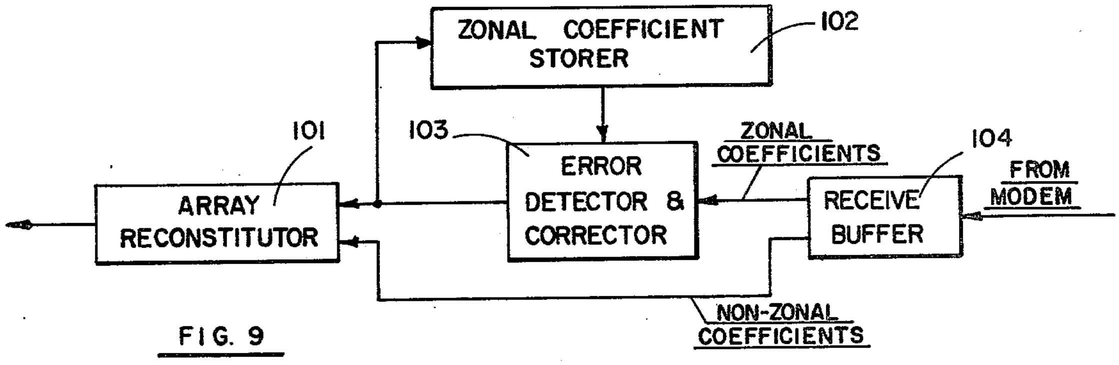
FIG. 9 is a block diagram illustrating a preferred embodiment of the error detector and corrector, and transform array reconstitutor of the invention.

Referring now to FIG. 9, the block diagram of a method for error correction and transform array reconstruction is illustrated. The block of zonal coefficients and the string of non-zonal coefficients from the receive modem enter the receive buffer 104 where the block of zonal coefficients is broken down into individual groups of zonal coefficients which correspond to each array of transform coefficients. The zonal coefficients in each group are then transferred to the error detector and corrector 103 for parity check and the replacement of any erroneous zonal coefficients by the like zonal coefficient for the prior scan of the same area of video data which has been stored in the zonal coefficient storer 102. Memory requirements for the zonal coefficient storer are moderate, since only the zonal coefficients need be stored. The non-zonal transform coefficients from the receive buffer are combined with the zonal coefficients in the array reconstitutor 101. The non-zonal coefficients are inserted in the reconstituted array of transform coefficients in accord with their identifying addresses. Coefficients eliminated by the adaptive threshold filter are replaced by zeros in the reconstituted transform vector.

Figure 10:
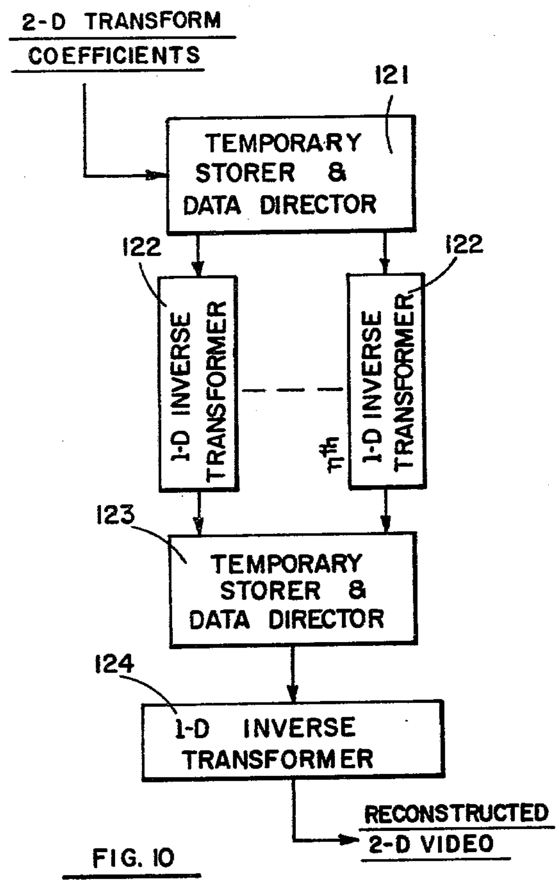
FIG. 10 is a block diagram illustrating the mechanization of a 2-D inverse Harr transformer, which is the counterpart of configuration "A" in FIG. 2.
Figure 11:
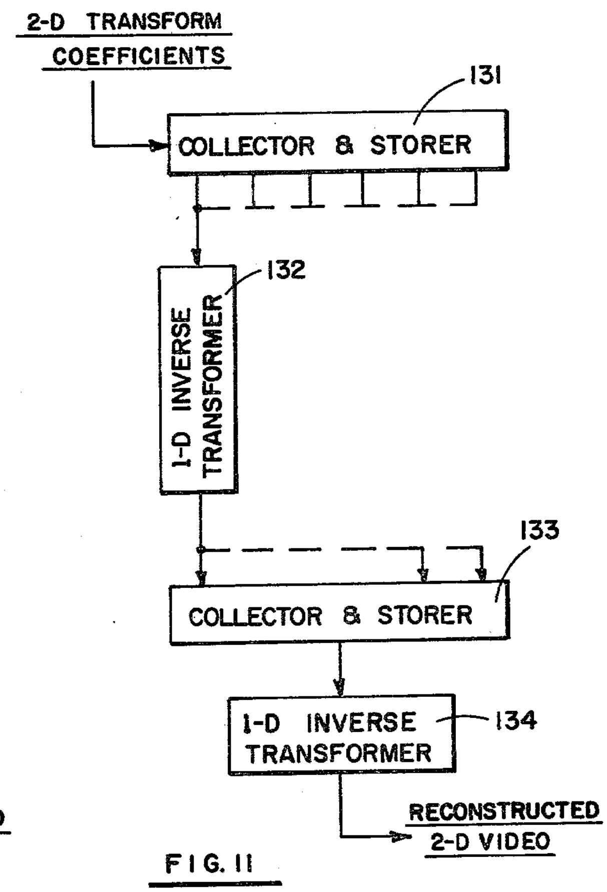
FIG. 11 is a block diagram illustrating the mechanization of a 2-D inverse Harr transformer which is the counterpart of configuration "B" in FIG. 3.
Figure 12:
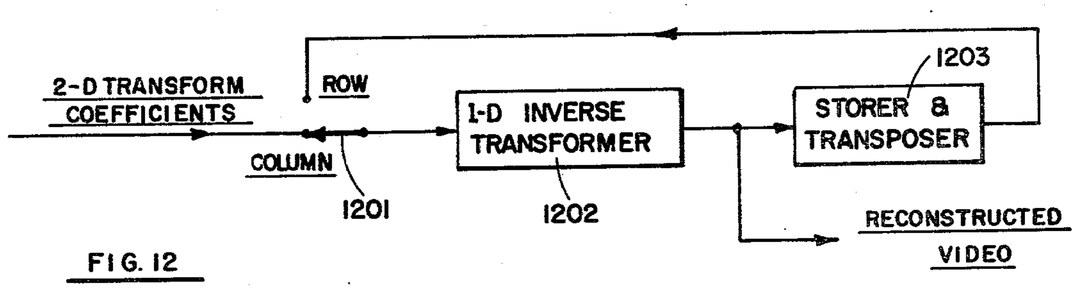
FIG. 12 is a block diagram illustrating the mechanization of a 2-D inverse Haar transformer which is the counterpart of configuration "C" in FIG. 5.

Referring now to FIGS. 10, 11 and 12, the block diagrams of various embodiments of the inverse Haar transformer are illustrated. The detailed description of the mechanization and operation of the one-dimensional inverse transformer which appears in FIG. 8 of the prior U.S. Pat. No. 3,981,443, is incorporated by reference. The two-dimensional inverse transformer such as the Haar transformer is mechanized by means of a combination of one or more one-dimensional inverse transformers in any of the manners illustrated in FIGS. 10, 11 and 12 in a manner analogous to that depicted in FIGS. 2, 3, and 4 for the 2-D Transformer. Departures in FIGS. 10, 11, 12 from what would be exactly analogous to the block diagrams in FIGS. 2, 3 and 4 illustrate a few of the many different functional organizations which can be used to obtain the same result. The embodiments depicted in FIGS. 10, 11 and 12 are denoted inverse transformer configurations "A", "B" and "C" respectively.

As indicated above, the 2-D inverse transformer also can be mechanized in the manner depicted in FIGS. 5 and 6.

While this invention has been described and illustrated in detail, it is to be clearly understood that this description is intended by way of illustration and example only and is not to be taken by way of limitation, the spirit and scope of this invention being limited only by the terms of the following claims.

ALGORITHM FOR 2D HAAR TRANSFORMATION (CIRCUIT OF FIG. 6)

| OPERATION DESCRIPTION | PGM CTR 612 | SUB CTR 610 | MEMORY MAP | EN | ADR. CO-EFF CLK | PROCESS CONTROL RAM 0 | 1 | 2 | 3 | 4 | 5 | 6 | $\phi_S$ | MEM ADR |
|---|---|---|---|---|---|---|---|---|---|---|---|---|---|---|
| *TRANSFORM FIRST ROW | | | | | | | | | | | | | | |
| Load 62 with Data A | 0 | 0 | F(0) | 1 | 0 | 1 | 1 | 1 | 0 | 0 | 1 | 1 | 0 | 0 |
| Load 65 with Data B | 1 | | | 1 | 0 | 1 | 0 | 1 | 1 | 0 | 1 | 1 | 0 | 0 |
| Store(A+B)/2 into RAM(0) | 2 | | | 0 | 0 | 0 | 0 | 0 | 0 | 0 | 1 | 0 | 0 | 0 |
| Store(A−B)/2 into RAM(6) | 3 | | | 1 | 0 | 0 | 0 | 0 | 0 | 1 | 1 | 0 | 0 | 6 |
| Load 62 with Data C | 4 | | | 1 | 0 | 1 | 1 | 1 | 0 | 0 | 1 | 1 | 0 | 7 |
| Load 65 with Data D | 5 | | | 1 | 0 | 1 | 0 | 1 | 1 | 0 | 1 | 1 | 0 | 7 |
| Store(A−B)/2 into RAM(7) | 6 | | | 1 | 0 | 0 | 0 | 0 | 0 | 1 | 1 | 0 | 0 | 7 |
| Load 65 with (A+B)/2, | | | | | | | | | | | | | | |
| 62 with RAM(0) | 7 | | | 0 | 0 | 0 | 1 | 0 | 1 | 0 | 1 | 1 | 0 | 0 |
| Store(A+B)/2 into RAM(4) | 8 | | | 1 | 0 | 0 | 0 | 0 | 0 | 0 | 1 | 0 | 0 | 4 |
| Store(A−B)/2 into RAM(5) | 9 | | | 1 | 0 | 0 | 0 | 0 | 0 | 1 | 1 | 0 | 0 | 5 |
| *End of Transform, ROW 1 | | | | | | | | | | | | | | |
| Inc.Subroutine CNTR 610 | | | | | | | | | | | | | | |
| Select MAP: ADR→ADR+4 } | 0 | 1 | F(4) | 1 | 0 | 0 | 0 | 0 | 0 | 0 | 1 | 0 | 1 | 0 |
| Reset PGM CTR 612 to | | | | | | | | | | | | | | |
| Zero | | | | | | | | | | | | | | |
| *End of Transform, ROW 2 | | | | | | | | | | | | | | |
| *(First 9 instructions | | | | | | | | | | | | | | |
| repeated) | | | | | | | | | | | | | | |
| Inc.Subroutine CNTR 610 | | | | | | | | | | | | | | |
| Select MAP: ADR→ADR+8 } | 0 | 2 | F(8) | 1 | 0 | 0 | 0 | 0 | 0 | 0 | 1 | 0 | 1 | 0 |
| Reset PGM CTR 612 to | | | | | | | | | | | | | | |
| Zero | | | | | | | | | | | | | | |
| *End of Transform, ROW 3 | | | | | | | | | | | | | | |
| *(First 9 instructions | | | | | | | | | | | | | | |
| repeated) | | | | | | | | | | | | | | |
| Inc.Subroutine CNTR 610 | | | | | | | | | | | | | | |
| Select MAP: ADR→ADR+12 } | 0 | 3 | F(12) | 1 | 0 | 0 | 0 | 0 | 0 | 0 | 1 | 0 | 1 | 0 |
| Reset PGM CNTR 612 to | | | | | | | | | | | | | | |
| Zero | | | | | | | | | | | | | | |
| *End of Transform, ROW 4 | | | | | | | | | | | | | | |
| *(First 9 instructions | | | | | | | | | | | | | | |
| repeated) | | | | | | | | | | | | | | |
| *Time to Transform | | | | | | | | | | | | | | |
| Columns | | | | | | | | | | | | | | |
| Inc.Subroutine CNTR 610 | | | | | | | | | | | | | | |
| Select MAP: ADR→ADR } | 10 | 4 | F(0) | 1 | 0 | | | | | | | | | |
| Reset PGM CNTR 612 to | | | | | | | | | | | | | | |
| 10 | | | | | | | | | | | | | | |
| *TRANSFORM FIRST COLUMN + OUTPUT DATA | | | | | | | | | | | | | | |
| Load 62 with RAM(4) | 11 | 4 | F(0) | 1 | 0 | 0 | 1 | 0 | 0 | 0 | 1 | 1 | 0 | 4 |
| Load 65 with RAM(8) | 12 | | | 1 | 0 | | 0 | 1 | 1 | 0 | 1 | 1 | 0 | 8 |
| Store(A+B)/2 into RAM(0) | 13 | | | 0 | 0 | | 0 | 0 | 0 | 0 | 1 | 0 | 0 | 0 |
| Store(A−B)/2 into RAM(2) | 14 | | | 0 | 0 | | 0 | 0 | 0 | 1 | 1 | 0 | 0 | 2 |
| Load 62 with ROM(12) | 15 | | | 1 | 0 | | 1 | 0 | 0 | 0 | 1 | 1 | 0 | 12 |
| Load 65 with ROM(16) | 16 | | | 1 | 0 | | 0 | 1 | 1 | 0 | 1 | 1 | 0 | 16 |
| Store(A−B)/2 into ROM(3) | 17 | | | 0 | 0 | | 0 | 0 | 0 | 1 | 1 | 0 | 0 | 3 |
| Load 65 with (A+B)/2, | | | | | | | | | | | | | | |
| 62 with RAM(0) | 18 | | | 0 | 0 | | 0 | 0 | 1 | 0 | 1 | 1 | 0 | 0 |
| Output(A) = (A+B)/2 | 19 | | | 0 | 1 | | 0 | 0 | 0 | 0 | 1 | 1 | 0 | 0 |
| Output(A) = (A−B)/2 | 20 | | | 0 | 1 | | 0 | 0 | 0 | 1 | 1 | 1 | 0 | 0 |
| Load 65,62 with RAM(2) | 21 | | | 0 | 0 | | 1 | 1 | 1 | 0 | 1 | 1 | 0 | 2 |
| Output(A) = (A+B)/2 | 22 | | 0 | 1 | | 0 | 0 | 0 | 0 | 1 | 1 | 0 | 0 | |
| Load 65,62 with RAM(3) | 23 | | | 0 | 0 | | 1 | 1 | 1 | 0 | 1 | 1 | 0 | 3 |
| Output(A) = (A+B)/2 | 24 | | | 1 | 1 | 0 | 0 | 0 | 0 | 0 | 1 | 1 | 0 | 0 |
| *End of Transform, | | | | | | | | | | | | | | |
| Column 1 | | | | | | | | | | | | | | |
| Inc.Subroutine CNTR 610 | | | | | | | | | | | | | | |
| SEL MAP: ADR→ADR+1 } | 11 | 5 | F(1) | 1 | 0 | 0 | 0 | 0 | 0 | 0 | 1 | 0 | 1 | 4 |
| Reset PGM CNTR to 11 | | | | | | | | | | | | | | |
| *End of Transform, | | | | | | | | | | | | | | |
| Column 2 | | | | | | | | | | | | | | |
| *(Instructions 11→24 | | | | | | | | | | | | | | |
| repeated) | | | | | | | | | | | | | | |
| Inc.Subroutine CNTR 610 | | | | | | | | | | | | | | |
| Select Map: ADR→ADR+2 } | 11 | 6 | F(2) | 1 | 0 | 0 | 0 | 0 | 0 | 0 | 1 | 0 | 1 | 4 |
| Reset PGM CNTR to 11 | | | | | | | | | | | | | | |
| *End of Transform, | | | | | | | | | | | | | | |
| Column 3 | | | | | | | | | | | | | | |
| Inc.Subroutine CNTR 610 | | | | | | | | | | | | | | |
| Select Map: ADR→ADR+3 } | 11 | 7 | F(3) | 1 | 0 | 0 | 0 | 0 | 0 | 0 | 1 | 0 | 1 | 4 |
| Reset PGM CNTR to 11 | | | | | | | | | | | | | | |
| *End of Transform, | | | | | | | | | | | | | | |
| Column 4 | | | | | | | | | | | | | | |

-continued

ALGORITHM FOR 2D HAAR TRANSFORMATION (CIRCUIT OF FIG. 6)

| OPERATION DESCRIPTION | PGM CTR 612 | SUB CTR 610 | MEMORY MAP | EN | ADR. CO-EFF CLK | PROCESS CONTROL RAM 0 | 1 | 2 | 3 | 4 | 5 | 6 | $\phi_S$ | MEM ADR |
|---|---|---|---|---|---|---|---|---|---|---|---|---|---|---|
| Inc.Subroutine CNTR 610<br>Select Map: ADR→ADR+0<br>Reset PGM CNTR<br>*Start Over | 0 | 0 | F(0) | 1 | 0 | 0 | 0 | 0 | 0 | 0 | 1 | 0 | 1 | 0 |

I claim:

1. A system for reducing the bandwidth required for the transmission of two-dimensional video data comprising:
two-dimensional transformer means for transforming said video data into arrays of transform coefficients,
transform coefficient compressor means for separating the transform coefficients into zonal coefficients, all of which are transmitted, and non-zonal coefficients of which the largest "n" coefficients are selected for transmission, for arranging the zonal coefficients such that such zonal coefficients may be identified by their position in the stream of data, and for attaching identification data to the non-zonal coefficients; and
transmitting modem means for transmitting the coefficients output from the transform coefficient compressor.

2. The system of claim 1 wherein the transform coefficient compressor means comprise
means for separating the transform coefficients into zonal coefficients, all of which are transmitted, and non-zonal coefficients of which those non-zonal coefficients which exceed an adaptive threshold are selected for transmission,
arranging and identifying means for arranging the zonal coefficients such that such zonal coefficients may be identified by their position in the stream of data, and for attaching identification data to the non-zonal coefficients,
transmission buffer means for temporarily storing coefficients prior to transmission by the transmitting modem means, and
means for periodically and automatically adjusting the adaptive threshold so as to maintain the transmission bandwidth constant and avoid overflow in the transmission buffer means.

3. The system of claim 2 and additionally comprising:
receiving modem means for receiving the transform coefficients,
transform array reconstitutor means for reconstructing the array of transform coefficients, and
inverse two-dimensional transformer means for obtaining an approximation to the original two-dimensional video data from the arrays of transform coefficients.

4. The system of claim 2 and additionally comprising:
means for adding parity bits to the zonal coefficients prior to transmission,
receiving modem means for receiving the transform coefficients,
error corrector and array reconstitutor means for identifying and correcting errors in the zonal coefficients and reconstituting the arrays of transform coefficients, and
inverse two-dimensional transformer means for obtaining an approximation to the original two-dimensional video data from the arrays of transform coefficients.

5. The system of claim 1 and additionally comprising:
receiving modem means for receiving the transform coefficients,
transform array reconstitutor means for reconstructing the arrays of transform coefficients, and
inverse two-dimensional transformer means for obtaining an approximation to the original two-dimensional video data from the arrays of transform coefficients.

6. The system of claim 1 and additionally comprising:
means for adding parity bits to the zonal coefficients prior to transmission,
receiving modem means for receiving the transform coefficients,
error corrector and array reconstitutor means for identifying and correcting errors in the zonal coefficients and reconstituting the arrays of transform coefficients, and
inverse two-dimensional transformer means for obtaining an approximation to the original two-dimensional video data from the arrays of transform coefficients.

7. The system of claim 1 wherein said two-dimensional transformer means (configuration "B") comprises:
one-dimensional transformer means for transforming the video data in one dimension,
a pair of transposer means for transposing the transform coefficients,
a pair of selector means for selecting and interchanging the pair of transposer means, and
second one-dimensional transformer means for transforming the video data in the second dimension.

* * * * *